United States Patent [19]

Murphy et al.

[11] Patent Number: 4,857,759
[45] Date of Patent: Aug. 15, 1989

[54] ALTERNATING CURRENT OUTLET ADAPTER

[76] Inventors: Gordon J. Murphy, 638 Garden Ct., Glenview, Ill. 60025; Martin A. Plonus, 2525 Orrington, Evanston, Ill. 60201

[21] Appl. No.: 156,832

[22] Filed: Feb. 17, 1988

[51] Int. Cl.⁴ .................. G01R 21/00; H01H 43/04
[52] U.S. Cl. ............................... 307/141; 307/140; 364/483
[58] Field of Search .................. 307/141, 140, 31; 364/141, 143, 144, 145, 483, 485; 200/38 D, 38 DA, 38 C

[56] References Cited

U.S. PATENT DOCUMENTS

| | | | |
|---|---|---|---|
| 3,629,664 | 12/1971 | Lajole | 307/141 X |
| 4,198,574 | 4/1980 | Price et al. | 307/97 |
| 4,355,361 | 10/1982 | Riggs et al. | 364/483 |
| 4,494,012 | 1/1985 | Coker | 307/141 X |
| 4,540,984 | 9/1985 | Waldman | 307/141 X |
| 4,573,127 | 2/1986 | Korff | 364/493 |
| 4,591,781 | 5/1986 | Larson | 307/141 X |
| 4,611,295 | 9/1986 | Fowler | 307/86 X |
| 4,672,232 | 6/1987 | Schoen | 307/141 X |
| 4,688,878 | 5/1987 | Wyss | 307/141 |

Primary Examiner—William M. Shoop, Jr.
Assistant Examiner—Sharon D. Logan
Attorney, Agent, or Firm—Gerstman & Ellis, Ltd.

[57] ABSTRACT

A system is provided for automatically switching an electric circuit on and off at certain times of the day, in which those certain times of the day vary throughout the year in accordance with a pattern built into the system and are not intended to be altered by the user. A computer timer provides the time of day and day of the year. A memory is permanently programmed with data that are stored to identify switch-on times and switch-off times for each day. The time of day and day of the year are compared with the switch-on times and switch-off times that are stored in the memory, and a current switching device is operated accordingly to switch an appliance, such as an electric lamp, on and off at the programmed switch-on times and switch-off times, respectively.

8 Claims, 4 Drawing Sheets

ALTERNATING CURRENT OUTLET ADAPTER

TECHNICAL FIELD

The present invention relates to timing systems, and particularly to a timer that can automatically turn a light or other electric appliance on and off at preprogrammed varying times each day.

BACKGROUND OF THE INVENTION

There are numerous applications today in which automatic control of lighting in a home is useful and desirable. For example, a common use of such a timed device is to create the appearance that the house is occupied when in fact the residents are away on vacation. In a number of these applications, an electromechanical device or an electronic device is used to provide a switching action that connects a lamp to the AC supply at one time and disconnects the lamp from the AC supply at another time. In some such systems, the switching action is initiated by a timer, and in other such actions the switching action is initiated by a light sensor.

A commonly encountered difficulty with the systems in which light sensing is used is that the sensitivity of the light sensor must be adjusted in accordance with the environment in which the device is installed. Moreover, in such applications, the presence of clouds or other obstructions of the sum can cause the lamp to be switched on at an inappropriate time of day. Also, in some such applications, the presence of a second source of artificial light can interfere with the desired operation of the lighting control system. For these reasons, among others, the use of a timer instead of a light sensor is often preferred.

The timed switching systems known to be available for the control of home lighting are designed to enable the user to "program" the times at which the lamp is switched on and off. In some devices, an analog input is provided for, with an analog display of the programmed time. In other devices, a digital keypad is provided for the entry of programmed times, and a digital display is provided. A common problem encountered in the use of all such devices is the complexity of the programming procedure. For many people, the programming procedure is too difficult to learn. For others, the procedure is too difficult to remember from one use of the device to another. Even those who can learn and remember how to use such a timing device often find it inconvenient to use because of the time required for the programming operation and the inconvenience of having to program the device several times during the year to match the changing times of dusk during the year. A common experience is for the resident of the house to think of the timer as he is preparing to leave the house, in a rush to depart on his vacation and already burdened with other last minute concerns.

Another undesirable feature of the timed switching systems is that if there is a power failure or if the system is disconnected from the alternating current supply, the timing information stored in the system is lost, except in a few systems in which a battery backup is provided.

SUMMARY OF THE INVENTION

In accordance with the present invention, an electronic clock is used to provide the time of day on a continuing basis. A battery is provided to ensure that correct time is maintained by the clock even in the event of an alternating current power failure and in spite of removal of the electronic clock from all sources of alternating current power. In the illustrative embodiments, the device is programmed by the manufacturer to switch a lamp or other electric appliance on at approximately dusk each day and off at a predetermined later time each day, in accordance with a schedule of the variation in the time of dusk throughout the year, which is electronically stored within the device at the time of manufacture. Thus, the user is spared the problems of programming the device himself as well as having to change the program several times during the year to account for changes in the time of dusk. The device is completely automatic; it need only be plugged into a normal alternating current outlet, and the lamp or other appliance to be controlled is then simply plugged into a receptacle of the device.

BRIEF DESCRIPTION OF THE DRAWINGS

The above and other advantages and features of the invention will be apparent to those skilled in the art from the following detailed description and claims, taken in conjunction with the accompanying drawings, in which:

DETAILED DESCRIPTION OF THE INVENTION

Figure 1:
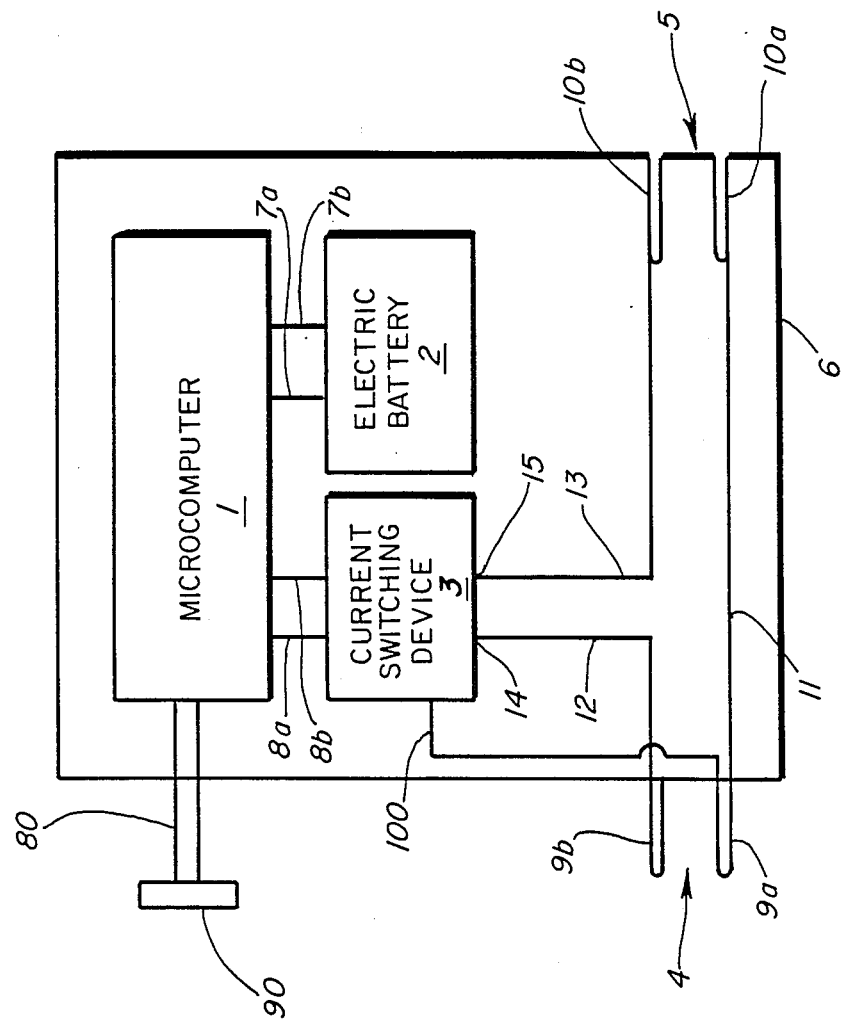
FIG. 1 is a block diagram of the novel computer timer.

With reference to FIG. 1, one embodiment of the novel system that achieves completely automatic control of the lamp or other electric appliance is shown in block schematic form. As there is shown, a microcomputer 1 is provided which may comprise a microprocessor, memory, and an input/output port. An electric battery 2 is included, to provide electric power for the operation of the microcomputer 1 and a current switching device 3 which is also provided. Also included are an electric plug 4, an electric outlet 5, and a housing 6. The battery 2 is connected to the microcomputer 1 by conductors 7a and 7b, and the current switching device 3 is connected to the microcomputer 1 by conductors 8a and 8b. One blade 9a of the plug 4 is connected by one blade 10a of the outlet 5 by a conductor 11. The second blade 9b of the plug 4 is connected to one terminal 14 of the current switching device 3 by a conductor 12, and the second blade 10b of the outlet 5 is connected to another terminal 15 of the current switching device 3 by a conductor 13. In some embodiments of the system, an additional conductor 100 may be provided, so that at least most of the current required to activate the current switching device 3 can be obtained from the alternating current supply instead of from the battery 2.

The microcomputer bus 80 is made available at a connector 90, so that the clock can be set prior to the time of delivery of the device to the customer, by means of circuitry not shown in FIG. 1 and not a part of this invention. Procedures for setting the clock are well-known to those skilled in the art and may be the same as the procedure used in setting the time of the clock in a video cassette recorder, for example.

Under control of a program stored in its memory, the microcomputer 1 maintains the correct time, including the day of the year, the hour and the minute, and compares that time with an approximate time of dusk that may vary from day to day, which is also stored in the memory of the microcomputer 1. When the time of day becomes equal to the stored turn-on time for that day, the microcomputer 1 sends a signal to the current switching device 3 on the conductors 8a and 8b that connect the current switching device 3 to the microcomputer 1. In response to that signal, the current switching device 3 causes its normally open terminals 14 and 15 to become connected together (or "closed"), thus completing the circuit between the plug 4 and the outlet 5 via the conductors 12 and 13 that connect the plug 4 and the outlet 5, respectively, to the current switching device 3. In this way, electric power from the normal electric outlet into which the plug 4 may be plugged is made available to the outlet 5 contained in the computer timer.

The connection of the plug 4 to the outlet 5 through the current switching device 3 is maintained by the signal provided by the microcomputer 1 on the conductors 8a and 8b that connect the current switching device 3 to the microcomputer 1 until a later time determined by other data stored in the memory of the microcomputer 1. At that later time, under control of the program stored in its memory, the microcomputer 1 removes the signal sent to the current switching device 3 on the conductors 8a and 8b that link the current switching device 3 to the microcomputer 1. In response to this action, the terminals 14 and 15 of the current switching device 3 return to their normally open condition, thus disconnecting the outlet 5 from the plug 4. Consequently, power from the normal electric outlet into which the plug 4 may be plugged is no longer available at the outlet 5 contained within the computer timer.

The process described is repeated daily, with the time at which the outlet 5 and the plug 4 are connected together and the time at which they are again disconnected determined entirely and automatically by the data that were stored in the memory of the microcomputer 1, without requiring any programming whatever by the user at any time.

Figure 2:
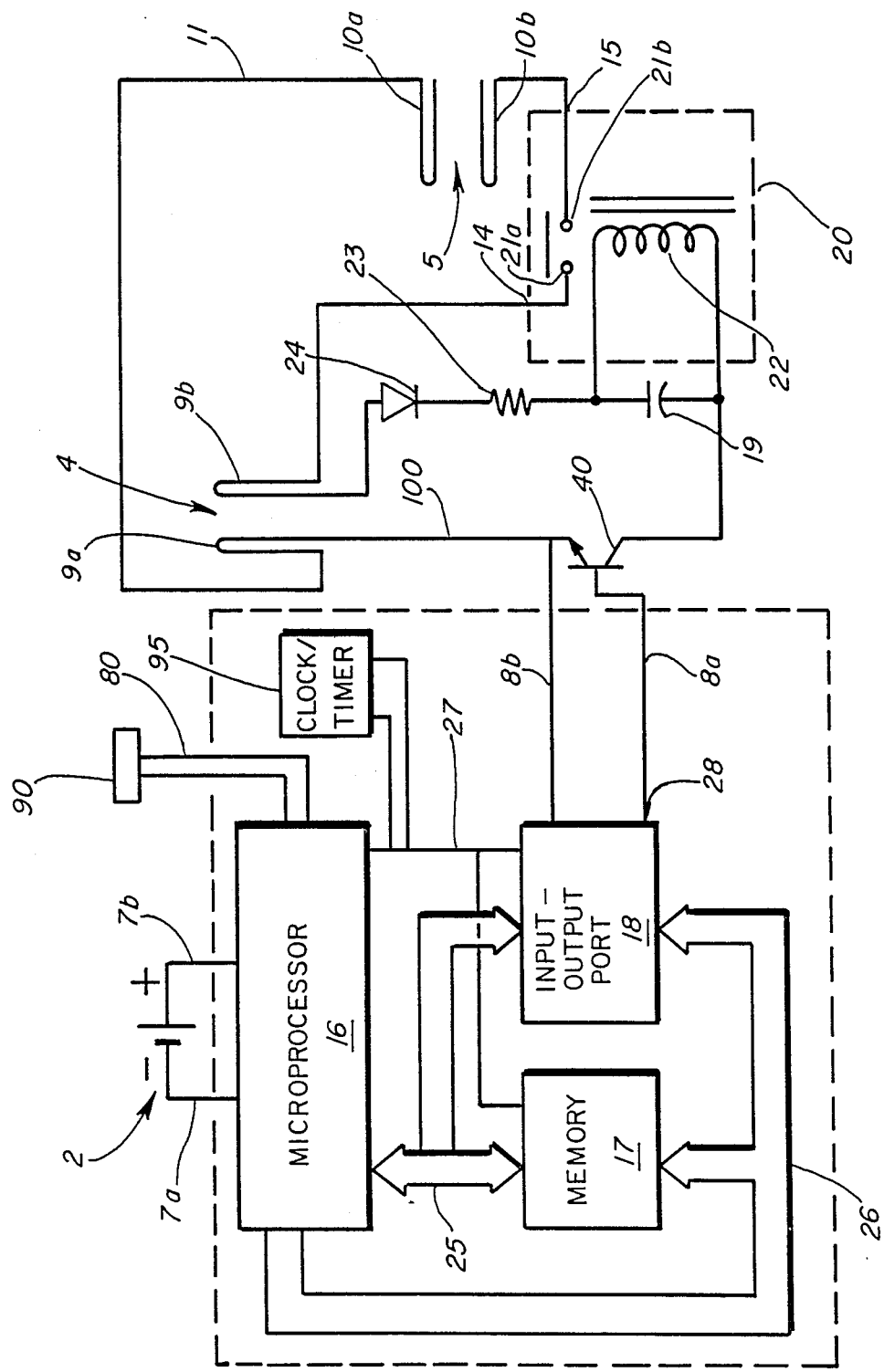
FIG. 2 is a more detailed diagram of the system shown in FIG. 1.

With reference to FIG. 2, one embodiment of the invention is shown in greater detail. The microcomputer 1 consists of a microprocessor 16, a memory 17, and an input/output port 18, all interconnected by a data bus 25, an address bus 26 and control and power lines 27. The microprocessor 16 is understood to contain a crystal for timing purposes and the other circuitry customarily employed to ensure that the program stored in the memory 17 is executed in an orderly and predictable manner. The desired switching times on a daily basis are represented in the microcomputer 1 by data stored in the memory 17. The current switching device 3 consists, in this embodiment, of an electromechanical relay 20, a capacitor 19, a current limiting resistor 23, a high voltage transistor 40 and a diode 24. The battery 2 serves to maintain the required operating voltage on the microprocessor 16, the memory 17 and the input/output port 18, so that the real time clock 95 implemented in the microcomputer 1 is constantly in operation and the correct time is always available in the microcomputer 1.

One of the power lines 27 is connected through the microprocessor 16 to the negative terminal of the battery 2 and through the input-output port 18 via conductor 8b to one blade 9a of the plug 4. When the clock time becomes equal to the stored switch-on time, the microprocessor 16 causes a logic signal to be latched in the input/output port 18, with the result that the part from one blade 9b of the plug 4 to the second blade 9a of the plug 4 is completed through the saturated transistor 40. If alternating current power is available at the plug 4, then on the positive half of each alternating current cycle, current will flow from one blade 9b on the plug 4 through the diode 24 and the current limiting resistor 23 and the coil 22 of the electromagnet 20 and then through the saturated transistor 40 and finally through a third conductor 100, to return to the second blade 9a on the plug 4. Consequently, the relay 20 will be energized, with the result that the contacts 21a and 21b will be connected together, and thus blade 10b of the outlet 5 will be connected to blade 9b of the plug 4. Since blade 10a of the outlet 5 is permanently connected to blade 9a of the plug 4 by a conductor 11, power provided by the outlet 5 into which the plug 4 is connected will then be made available at the outlet 5 in the computer timer. The purpose of the capacitor 19 is to filter the alternating current and maintain a more nearly constant voltage on the coil 22 of the electromechanical relay 20, so that the relay 20 will remain energized throughout the negative half of each alternating current cycle, during which no current flows through the rectifier diode 24.

Later, when the clock timer becomes equal to the switch-off time, as determined by the data stored in the memory 17 in the microcomputer 1, the signal that was previously latched in the input/output port 18 is cleared by the microcomputer 1, under program control. The transistor 40 is cut off as a result. Consequently, sufficient current to energize the relay 20 can no longer flow in the circuit consisting of the rectifier diode 24, the resistor 23, the coil 22 of the relay 20, the transistor 40, and the conductor 100 that connects the input/output port 18 to the plug 4. As a result, the contacts 21a and 21b in the relay 20 are again opened, and thus power is removed from the outlet 5.

The microcomputer bus 80 connected to the connector 90 for the purpose of providing means for setting the clock prior to delivery of the computer timer to the customer comprises the address bus 26, the data bus 25, and the control lines and power lines 27 but is shown distinct from them in FIG. 2 for clarity.

It will be apparent to one skilled in the art that, although an electromechanical relay is shown in FIG. 2, the switching action desired can be effected by means of a triac or other solid-state electronic device instead.

Figure 3:
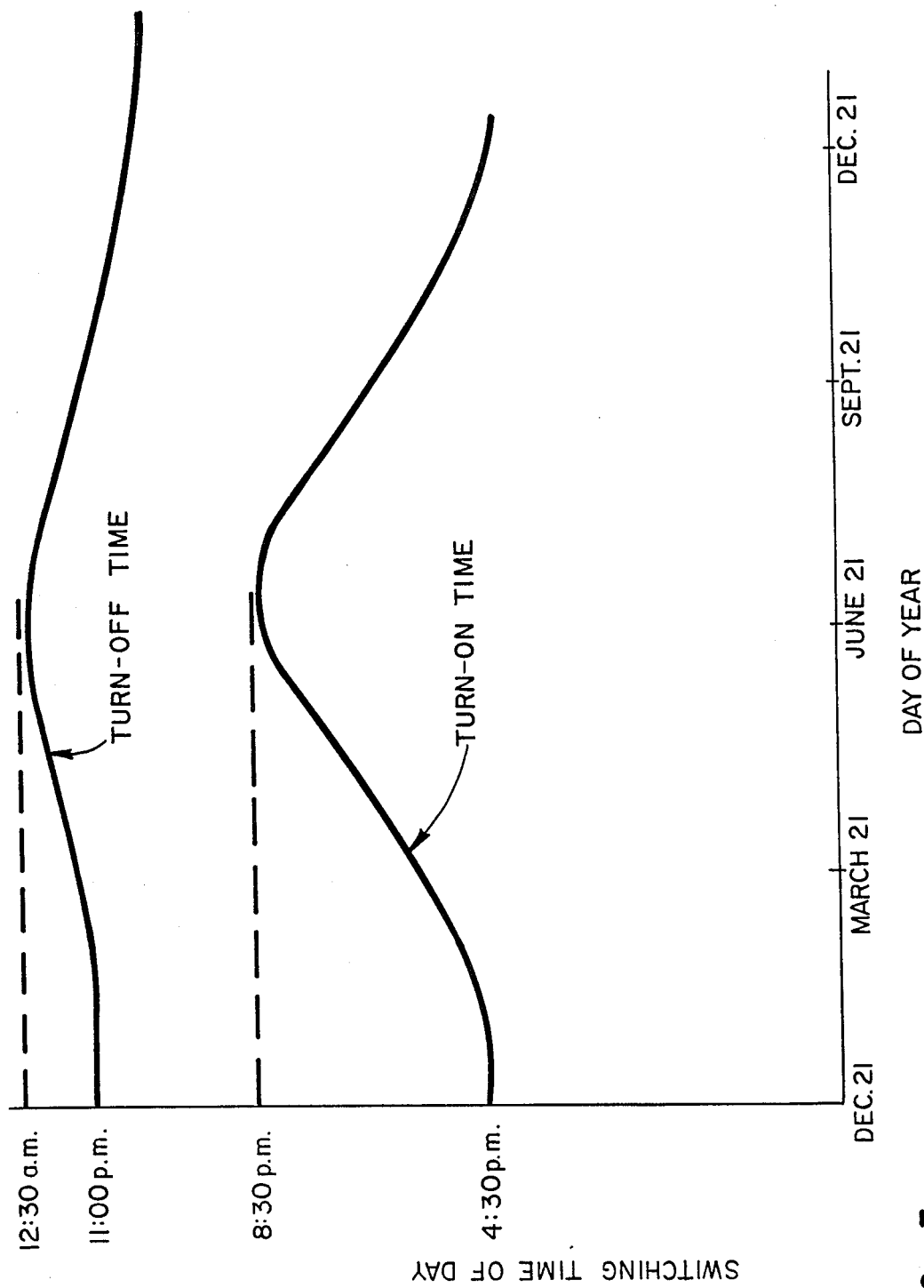
FIG. 3 is a diagram of the approximate way in which the stored switching times vary from day to day.

The manner in which the switching times are programmed to vary throughout the year in one embodiment of the invention is indicated in FIG. 3. Generally speaking, the circuit is switched on at the earliest time of day at the beginning of winter, when dusk occurs at the earliest time, and at the latest time of day at the beginning of summer, when duck occurs at the latest time. It is preferred that the switch-on to switch-off time interval is greater from about September 21 to about March 21 than from about March 21 to about September 21, and that the switch-on to switch-off time interval increases from about June 21 to about December 21 and decreases from about December 21 to about June 21. The variation in switch-off time in this embodiment is similar but less extensive, as shown in FIG. 3. In another embodiment of this invention, the switch-on time or the switch-off time or both may be unchanging throughout the year.

An improvement of value, particularly in security applications, can be made by employing a microcomputer programmed so that each switch-on time and/or switch-off time is the sum of two components; one component as described in the discussion of FIG. 3 and a second component that produces a significant variation in switching time from day to day even though the general trend in switching times over a year's time conforms to a more slowly changing pattern, as described in the discussion of FIG. 3.

Another improvement can be made by programming the microcomputer so that the second component causes multiple switch-on times and switch-off times per day within the "window" established by the switch-on time and the switch-off time shown in FIG. 3.

A modification of the system shown in FIG. 1 that falls within the scope of this invention is the placing of the plug 4 at the end of an electric cord that is connected as an extension of conductors 11, 12 and 100, instead of in the housing 6 as shown in FIG. 1.

A second modification of the system shown in FIG. 1 is the mounting of the system directly on a modified two-wire electric cord terminated at one end in an electric plug and at the other end in an electric outlet, which consists on one conductor that is continuous through the computer timer and a second, broken conductor, one end of which connects inside the computer timer to one terminal 14 of the current switching device 3 and the other end of which connects inside the computer timer to a second terminal 15 of the current switching device 3.

A third modification of the system shown in FIG. 1 is the substitution of a plug similar to the base of an electric light bulb for the plug 4 and the substitution of a socket adapted to receive an electric light bulb for the outlet 5. The computer timer can then be screwed into a lamp receptacle, and an electric light bulb can be screwed into the computer timer.

Figure 4:
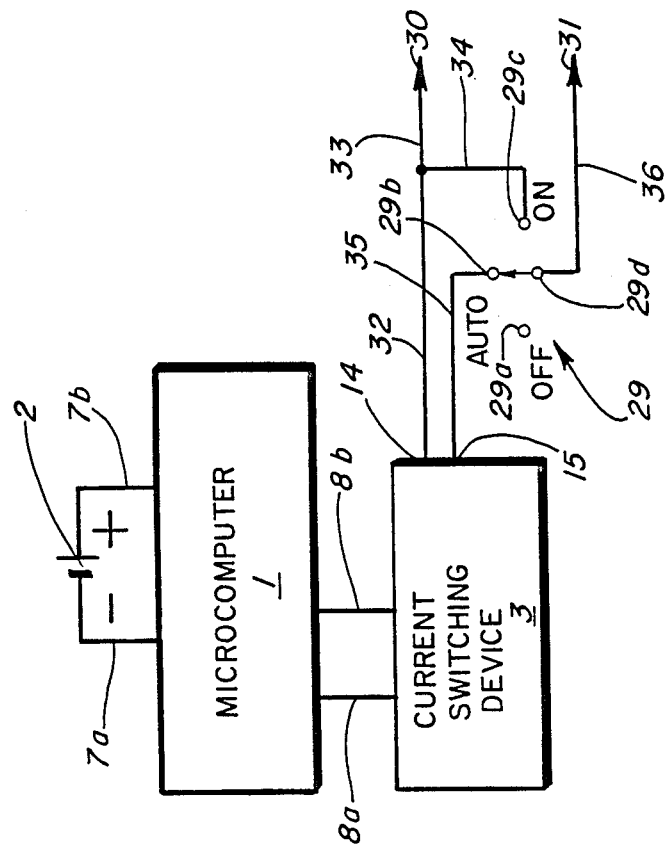
FIG. 4 is a diagram of a modification of the system shown in FIG. 1 for use as a replacement for a normal electric wall switch that controls an electric lamp or other electric appliance.

Still another modification of the system shown in FIG. 1 is shown in FIG. 4. The microcomputer 1, the electric battery 2, and the current switching device 3 are connected as in FIG. 1 and FIG. 2. One output terminal 14 of the current switching device 3 is connected by a conductor 32 and a second conductor 33 to the conductor or conductors that normally connect to one terminal of a normal wall-mounted electric switch or a normal lamp-mounted switch or a normal appliance-mounted switch. The same output terminal 14 of the current switching device 3 is connected by a conductor 32 and another conductor 34 to one fixed contact 29c on a three-position electric switch 29. The second output terminal 15 of the current switching device 3 is connected by a conductor 35 to a second fixed contact 29b of the three-position electric switch 29. A movable contact 29d on the three-position electric switch 29 is connected by a conductor 36 to the conductor or conductors that normally connect to the second terminal of the normal wall-mounted switch or the normal lamp-mounted switch or the normal appliance-mounted switch. A fourth terminal 29a on the three-position electric switch 29 is left unconnected. When the movable contact 29d is in contact with the first fixed contact 29c, the external circuit is completed regardless of the state of the current switching device 3; this is the "manual on" position of the electric switch 29. When the movable contact 29d is in contact with the second fixed contact 29b, the external circuit is automatically switched on and off by the current switching device 3, as described in the discussion of FIG. 1 and FIG. 2. This is the "automatic" position of the electric switch 29. When the movable contact 29d is in contact with the third fixed contact 29a, the external circuit is disconnected, regardless of the state of the current switching device 3. This is the "manual OFF" position of the electric switch 29.

A connector 90 and the computer bus 80 are provided for use in setting the time of the clock prior to the time of delivery of the computer timer to the customer, as mentioned in the discussion of FIG. 1 and FIG. 2.

While only particular embodiments of the invention have been described and illustrated, it is apparent that modifications may be made therein. It is the object of the invention in the appended claims to cover all such modifications as may fall within the true scope and spirit of the invention.

What is claimed is:

1. An alternating current outlet adapter for automatically switching an electric outlet on and off at certain times of the day, in which those certain times of the day vary throughout the year in accordance with a pattern built into the system and are not intended to be altered by the user, which comprises:

a household male plug for connection to a household alternating current receptacle;

an electric clock for providing the time of day and selected periods of the year;

a battery for insuring that the time and the period of the year are maintained by the clock;

memory means permanently programmed with unalterable data which are stored to provide switch-on times and switch-off times for each period of the year, said switch-on times and switch-off times being variable for different periods of the year;

switching means for providing switch-on signals and switch-off signals;

means for comparing the clock time and period of the year with the switch-on times and switch-off times stored in said memory means and for operating said switching means in accordance therewith;

an electric outlet for receiving an electrical connector from a lamp or other electric appliance to be switched on and off in accordance with the program; and means for coupling the switching means to said male plug and to said electric outlet so that said male plug and said electric outlet will be electrically connected from each switch-on time to the next later switch-off time and electrically disconnected at all other times.

2. An alternating current outlet adapter as described in claim 1, wherein said electric clock comprises a microcomputer.

3. An alternating current outlet adapter as described in claim 1, the time interval from each switch-on time to the next later switch-off time being greater from about September 21 to about March 21 than from about March 21 to about September 21.

4. An alternating current outlet adapter as described in claim 3, said time interval increasing from about June 21 to about December 21 and decreasing from about December 21 to about June 21.

5. An alternating current outlet adapter as described in claim 1, said switching means comprising a switching device including an electromagnetic relay.

6. An alternating current outlet adapter as described in claim 1, including a manually operable switch having selectively operable means for (a) maintaining said electric outlet in an on-state, (b) maintaining said electric outlet in an off-state, or (c) operating said electric outlet in accordance with said switching means.

7. An alternating current outlet adapter for automatically switching a lamp or other household electric appliance on and off at certain times of the day, in which those certain times of the day vary throughout the year in accordance with a pattern built into the system and are not intended to be altered by the user, which comprises:
- a microcomputer including timekeeping means for providing the time of day and day of the year;
- a battery for insuring that the time and day are maintained by the microcomputer;
- memory means permanently programmed to generate switch-on times and switch-off times for each day, said switch-on times and switch-off times being variable for different days of the year;
- switching means for providing switch-on signals and switch-off signals;
- means for comparing the time and day with the switch-on times and switch-off times stored in said memory means and for operating said switching means in accordance therewith;
- an alternating current household male electric plug adapted to receive electric power from a household receptacle;
- an alternating current electric outlet adapted to supply electric power, when said alternating current electric outlet is receiving electric power, to a lamp or other household electric appliance that is to be switched on and off in accordance with the program; and
- means for coupling said switching means to said alternating current household male electric plug and to said alternating current electric outlet so that said alternating current household male electric plug and said alternating current electric outlet will be electrically connected from each switch-on time to the next later switch-off time and electrically disconnected at all other times.

8. An alternating current outlet adapter as described in claim 7, including a manually operable switch having selectively operable means for (a) maintaining said electrical outlet in an onstate, (b) maintaining said electric outlet in an off-state, or (c) operating said electric outlet in accordance with said switching means.

* * * * *